No. 635,327. Patented Oct. 24, 1899.
K. KÜPPERS & H. SCHROEDER.
ACETYLENE GAS GENERATOR.
(Application filed May 1, 1899.)
(No Model.)
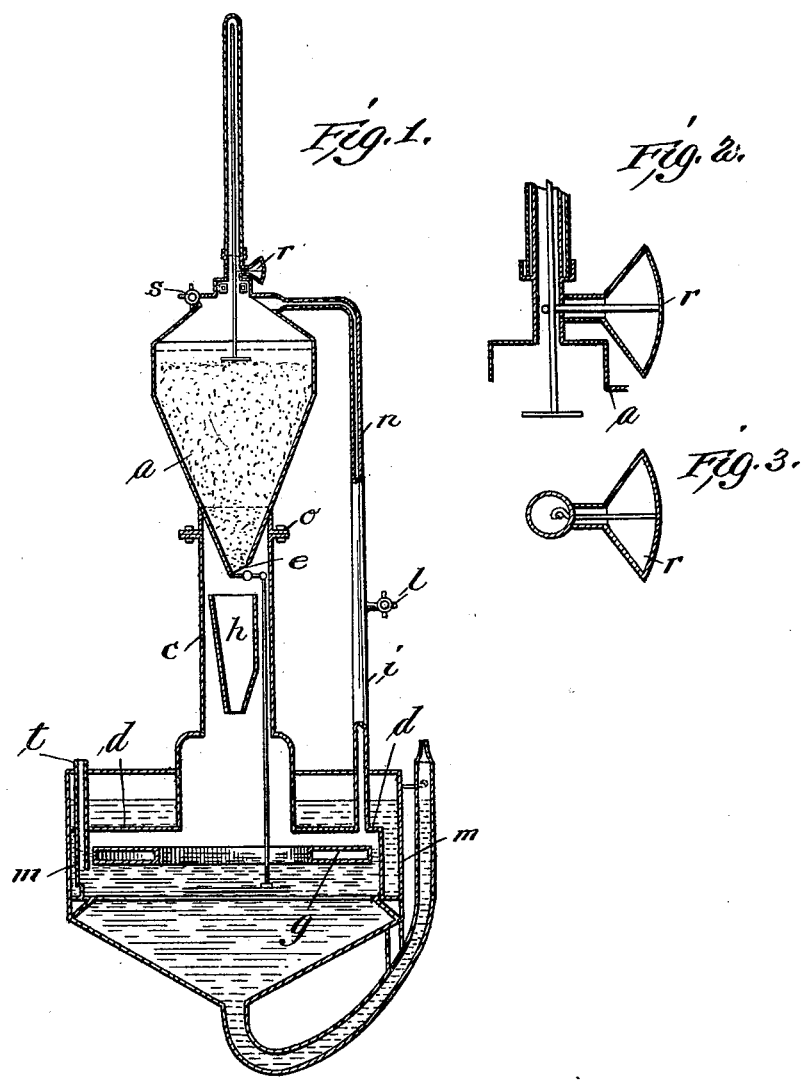

United States Patent Office.

KARL KÜPPERS AND HEINRICH SCHROEDER, OF AACHEN, GERMANY.

ACETYLENE-GAS GENERATOR.

SPECIFICATION forming part of Letters Patent No. 635,327, dated October 24, 1899.

Application filed May 1, 1899. Serial No. 715,169. (No model.)

*To all whom it may concern:*

Be it known that we, KARL KÜPPERS and HEINRICH SCHROEDER, citizens of the Kingdom of Prussia, and residents of Aachen, in the Kingdom of Prussia, German Empire, have invented certain new and useful Improvements in Generators for Acetylene Gas, of which the following is a specification.

The object of the present invention is an automatically-operating generator for acetylene gas, in which small quantities of carbid are successively thrown into the water.

The apparatus is provided with a device for measuring the quantity of carbid consumed without dismounting the whole.

In the accompanying drawings, Figure 1 shows a vertical section through the axis of the apparatus. Fig. 2 shows the measuring device in elevation and on an enlarged scale. Fig. 3 is the same as seen from above.

The receiver for the carbid $a$, closed tightly at its top, has at its lower end an opening ordinarily closed by a clack-valve $e$, the movements of which are controlled from an annular float $g$ by means of connecting-rods $f$. The receiver $a$ is fastened tightly by means of screw-bolts passed through a flange $o$ to a cylinder $c$, which opens below into the vessel $d$, imitating the form of a diver's bell and which is inserted into another vessel $m$ filled to a certain height with water. Just below the valve $e$ there is arranged a funnel-shaped tube $h$ for directing the carbid to the central opening of the float and to impede the scattering of the same. In the top of the bell-shaped vessel $d$ is arranged a gas-pipe $i$, from which a stop-cock $l$ leads to the cleaner. A second pipe $n$ leads from the top of the receiver to the same stop-cock. Differences in the internal pressure in the apparatus are avoided by means of these two pipes.

On the top of the receiver is arranged a vertical glass tube, in which rests a metal rod ending in a disk or a ball. This rod is engaged by the curved end of a second rod arranged horizontally and fixed with its free end to a curved metallic membrane $r$. Ordinarily the membrane is curved and the hook engaging the metallic rod presses the same against the walls of the tube, thereby preventing it from sliding downward. In order to measure the quantity of carbid consumed, the membrane is slightly pressed against. Then the hook lets go the rod and it slides down until the disk reaches the surface of the carbid contained in the receiver.

The receiver is charged with granulated carbid, which may be mixed with sand. The vessel $m$ is filled with water. On opening the cock $l$ the water begins to rise in the inner vessel $d$. The float also begins to rise, and the valve $e$ is opened by means of the connecting-rod $f$. A quantity of carbid falls through the funnel into the water, and the generation of gas begins. By the accumulation of gas in the receiver the level of the water is depressed, and the float $g$ sinks and shuts the valve $e$. As soon as the quantity of gas diminishes, the same play begins anew. The valve $s$ leads to a pressure-indicator.

The mud formed by the operation of the apparatus falls down into the funnel-shaped bottom of the outer vessel $m$, from where it may easily be removed by means of a flexible hose.

A pipe $t$ is passed through the top of the vessel $d$ and carried down with its lower end near the bottom of said vessel. It serves as a safety device for the escapement of gas, if in case of a breakdown the apparatus does not work well.

What we claim is—

An automatically-operating generator for acetylene gas, consisting in a vessel imitating the form of a diver's bell, to the top of which is fixed, by means of a tube, a receiver for the carbid, open at its bottom; said opening being controlled by a clack-valve, actuated by means of an annular float in the bell-shaped vessel, said vessel resting in another one, the bottom of which is funnel-shaped and provided at its lower end with a flexible hose for the purpose of removing the mud; pipes arranged in the top of the receiver and of the bell-shaped vessel serving for equalizing the internal gas-pressures in these parts; a glass tube, arranged on the top of the receiver and containing a metallic rod, ending in a disk and being held ordinarily in position by a spring-pressed hook, serving for measuring the quantity of carbid consumed; substantially as shown and described.

In testimony whereof we affix our signatures in presence of two witnesses.

KARL KÜPPERS.
HEINRICH SCHROEDER.

Witnesses:
G. SCOTT,
ELISE CRÜTZEN.